April 23, 1968 R. P. GUSTAFSON 3,379,034
YIELDABLE DRIVE COUPLINGS
Filed Oct. 14, 1966 2 Sheets-Sheet 1
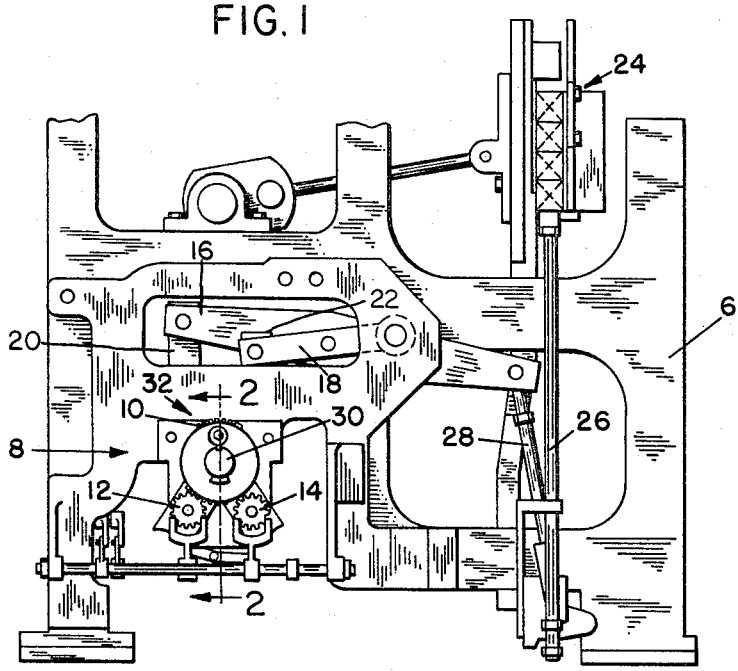
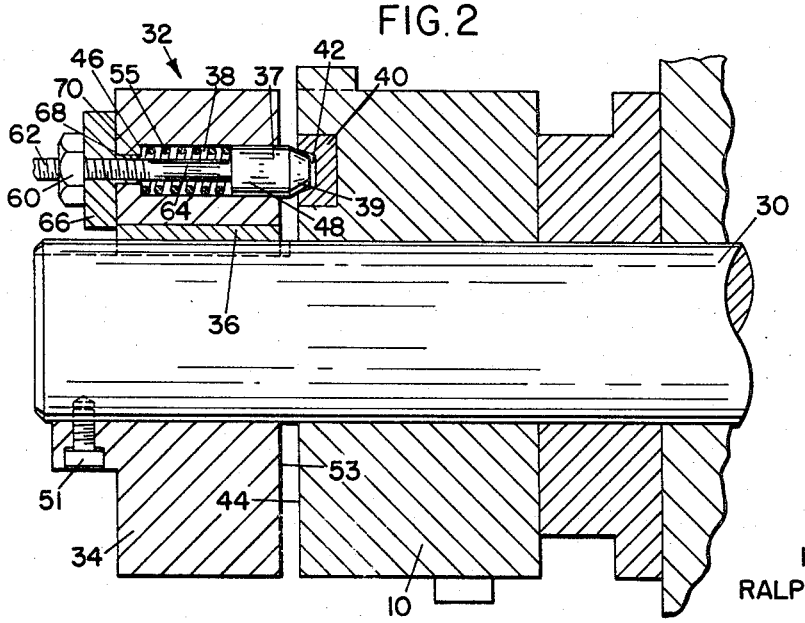
INVENTOR
RALPH P. GUSTAFSON
BY Howard J. Garner
ATTORNEY April 23, 1968 R. P. GUSTAFSON 3,379,034
YIELDABLE DRIVE COUPLINGS
Filed Oct. 14, 1966 2 Sheets-Sheet 2
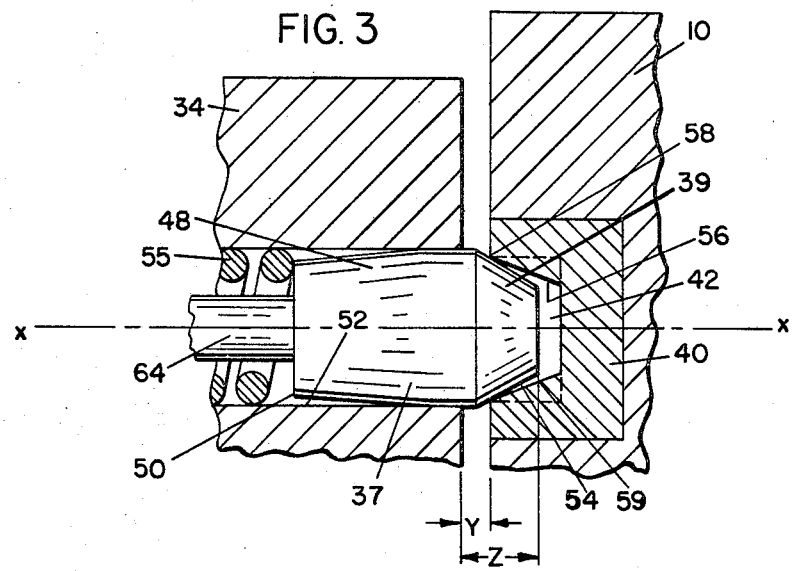
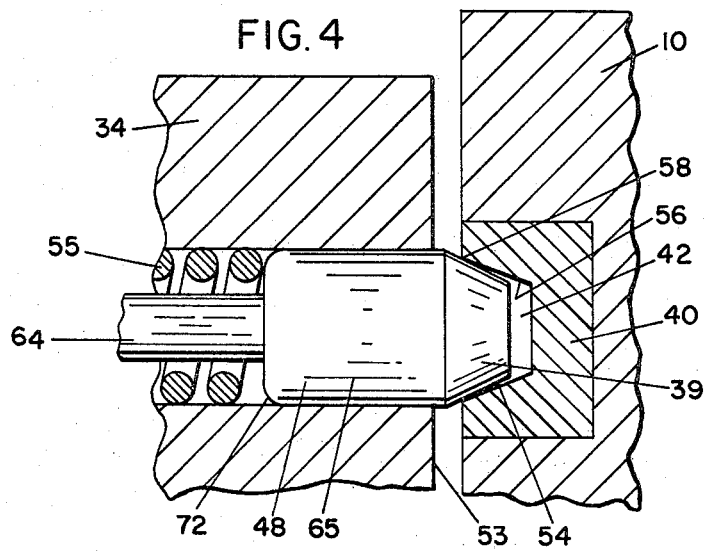
INVENTOR
RALPH P. GUSTAFSON
BY *Howard L. Horney Jr.*
ATTORNEY

United States Patent Office 3,379,034
Patented Apr. 23, 1968

3,379,034
YIELDABLE DRIVE COUPLINGS
Ralph P. Gustafson, Hubbardston, Mass., assignor to Crompton & Knowles Corporation, Worcester, Mass., a corporation of Massachusetts
Filed Oct. 14, 1966, Ser. No. 586,845
8 Claims. (Cl. 64—29)

This invention relates to improvements in yieldable drive coupling and more particularly to a yieldable drive coupling in a loom "box motion."

Yieldable drive couplings are generally used in drive mechanisms where the normal load for which the mechanism is likely to be exceeded due to some condition beyond the control of the driving mechanism. When such a load is exceeded, some portion of the coupling will yield, to discontinue a driving relation and avoid damage to the mechanism or other parts associated therewith. In a loom box motion, just such a condition is likely to occur and particularly the type of box motion which comprises a constantly rotating box motion driving member or "bull" gear operatively connected to a constantly rotating shaft, a pair of smaller gears which are selectively engaged by the "bull" gear and a pair of box levers respectively controlled by the smaller gears. The box levers are operatively connected to a gang of shuttle boxes. Whenever there is to be a change in position of the shuttle boxes, one or more of the smaller gears are engaged with the bull gear, thereby operating the box levers to lift or lower the shuttle boxes. There are certain conditions which can occur in a loom which will interfere with a normal box moving sequence. One such condition which can occur is that when the shuttle boxes are in motion, a shuttle which had not entered a shuttle box properly can be trapped between the shuttle boxes and some other part of the loom. This condition is commonly referred to as "box hang-up." As the box motion tries to continue moving the shuttle boxes during a "box hang-up," damage is likely to occur to any of the various parts in the "box motion" system.

To avoid the damaging condition described above, it has been customary to add a yieldable coupling to the box motion between the drive shaft and the main gear.

Conventional yieldable drive couplings such as those utilizing a driving member or a collar directly connected to the source of power, a driven member such as the main gear in the box motion and a spring loaded plunger yieldably connecting the driven and driving member have been found to be unsatisfactory. A problem with this type of drive coupling is that it is difficult to get uniform spring pressures on the plungers from one unit to another which will enable the plunger to stay in driving relation under normal conditions and disengage during an abnormally high load condition. Yieldable drive couplings in current use on box motions are of the type described above wherein the plunger has a spring biased head slidable in a retaining hole in the drive collar and the head having a portion with a conical surface which fits into a matching conical depression in the abutting surface of the main gear. A difficulty arises because of differences between the angles of the sloping surfaces of the conical depression and the plunger due to manufacturing tolerances. In some cases the plunger angle is less than that of the conical depression with respect to their longitudinal axis and the plunger makes contact at a point deep into the depression. In other cases where the angle of the plunger is greater than that of the depression, the plunger makes contact at the rim of the depression. In cases where the plunger makes contact at some point within the depression it takes more force to dislodge the plunger than when it makes contact at the rim of the depression because in the former case there is more distance between the point where the plunger protrudes from its retaining hole. This greater distance creates a longer moment arm and tends to cause the plunger to bind in its retaining hole. After the looms were built and were set up for operation it has been found that while attempting to achieve a standardized spring pressure on the plunger for every loom, some box motions would not disengage when there was excessive load due, for instance, to a "box hang-up"; resulting in damage to certain parts of the loom while other box motions would disengage under normal operational loads, thereby interfering with normal operation of the loom. In order to correct both conditions, each box motion had to be tested and then adjusted by either replacing the spring holding the plunger in place, or adjusting the pressure on the plunger.

Accordingly, it is an important object of the present invention to provide a yieldable drive coupling which will disengage at consistently uniform excessive load conditions.

It is another, more specific object of the invention to provide a yieldable drive coupling in which the plunger will always make contact at the rim of the depression to insure a consistent yielding condition under a uniform spring pressure.

According to the present invention the angle of the conical surface of the plunger is made at a greater angle than the side of the depression with respect to a longitudinal axis of the plunger and depression. The intended difference in angles between the conical surface of the plunger and the surface of the depression is great enough to insure that the plunger contacts the outer rim of the depression. The depression can be a cylindrical hole or the sides defining it can be of any angle as long as that in every case the angle of the conical surface of the plunger is greater than the angle of the side surface of the depression so that the plunger will always make contact at the outer rim of the depression. This insures that a uniform spring pressure can be set, against which the plunger will break away from engagement with the depression when a specified excessive load is imposed on the drive connection.

Another advantage of having the plunger always seat at the outer rim of the depression is that it eliminates the condition of a long moment arm for the portion of the plunger which extends from its retaining hole. As mentioned above, this greater moment arm causes the plunger to bind in its retaining hole thereby greatly magnifying the effects of a slight adjustment in spring pressure and making such adjustments difficult. As the plunger always seats at the outer rim of the depression there is less wear because the members make contact at their larger portions where there is larger radius of contact.

Other objects and advantages of the invention will become more fully apparent as reference is had to the accompanying drawings, FIG. 1 is a diagrammatic side elevation of a loom having a box motion with the invention applied thereto;

FIG. 2 is an enlarged section taken on line 2—2 of FIG. 1 and showing a yieldable drive coupling embodying the present invention;

FIG. 3 is a view of a portion of the yieldable drive coupling on a still further enlarged scale to clearly illustrate the invention;

FIG. 4 is a view similar to FIG. 3 and showing a modification of the plunger.

Referring to FIG. 1, there is generally shown the outline of a loom side designated by the reference character 6. Supported on loom side 6 is a box motion generally designated by the reference character 8. Box motion 8 includes a main gear 10 commonly known as a "bull gear," a pair of smaller pinion gears 12 and 14 and a pair of box lifter levers 16 and 18 operatively connected to gears 12 and 14 respectively through connection levers 20 and 22 respectively. Levers 16 and 18 are operatively connected to a gang of shuttle boxes 24 through lifter rods 26 and 28. Bull gear 10 is mounted for free rotation on a constantly rotating shaft 30 of the loom. Gear 10 is connected to shaft 30 for rotation thereby through a yieldable drive coupling generally indicated by the reference character 32 and to be described. Under normal operating conditions gear 10 rotates constantly with shaft 30. Gears 12 and 14 are selectively engaged with gear 10 by pattern means not shown but described more fully in U.S. Patent No. 3,128,796. When a change in the position of the gang of shuttle boxes 24 is called for, one or more of gears 12 and 14 are engaged by gear 10 thereby operating levers 16 and 18 to move the shuttle boxes. The exact manner in which this is done is described in the above mentioned U.S. patent.

Referring to FIGS. 2 and 3, yieldable drive coupling 32 comprises: a drive collar 34 keyed to shaft 30 at 36 for constant rotation therewith, a plunger 37 slidable in a retaining hole 38 in collar 34 and a wear resistant bushing 40 located in gear 10 and having a depression 42 which opens to surface 44 of gear 10. Plunger 37 has a head with a frustoconical portion 39 and a second portion 48 which is slidable in hole 38 and is substantially cylindrical but has a slight inward taper in a direction away from portion 39. The edge 50 of plunger 37 does not contact the surface 52 of hole 38 therefore eliminating the possibility of having edge 50 bind in the hole. Collar 34 is located on shaft 30 adjacent gears 10 and is held in position on the shaft by a set screw 51. When coupling 32 is in driving relation, plunger 37 protrudes from surface 53 of collar 34 and seats in the conical depression of bushing 40. Plunger 37 is kept in this position by a compression spring 55 which abuts portion 48 of plunger 37 and a shoulder 46 in hole 38. The pressure of spring 55 is such that plunger 37 will stay in depression 42 when coupling 32 is subjected to normal loads.

If for any reason the shuttle boxes are obstructed during a box shifting operation, as for instance a shuttle which has not boxed properly and becomes trapped on some stationary part of the loom, coupling 32 will be subjected to abnormally high loads. This abnormal load condition will cause plunger 37 to be cammed out of engagement with depression 42 against the action of spring 55 thereby disconnecting gear 10 from collar 34. This disengagement will of course prevent serious damage to the various parts of the box motion.

An important feature of the invention is illustrated in FIG. 3 which shows the sloping surface 54 of conical portion 39 at a slightly greater angle with respect to a longitudinal axis $x$—$x$ than is surface 56 of depression 42. A difference in angle between surfaces 54 and 56 of greater than 2° is large enough to insure that surface 54 will always contact the rim 58 of depression 42. Since plunger 37 makes a point contact at the rim of depression 42, the pressure angle will be determined by the angle of the plunger. As a result, the angle of the plunger should not be made to vary a great deal because the pressure angle is relatively critical. The angle of surface 56 of the depression, however, can be decreased to any angle without adverse effect, even to the point of defining a cylindrical hole as shown in dotted lines in FIG. 3.

Another advantage of having plunger 37 seat at the outer rim 58 of depression 42 is that the distance between the point where plunger 37 contacts bushing 40 and where it projects from surface 53 is kept at a minimum as shown by distance $y$ in FIG. 3, as compared to distance $z$ which could result from a case in which the plunger makes contact deep into the depression as for example at point 59 on surface 56. The greater distance $z$ creates a longer moment arm on the protruding end of the plunger which tends to cause the plunger to bind in retaining hole 38.

Therefore, in the present invention, with the plunger always making contact with rim 58, coupling 32 can utilize a more standardized spring and have the plunger set at a uniform spring pressure.

It is another important feature of the present invention that surface 54 be a straight slope as shown in FIG. 3. A curved surface is not desirable for the following reason: in many coupling devices the normal operating forces are not uniform, and in many cases some phases of operation are marked by periods of high accelerations which create forces approaching the contemplated disengaging force, causing the plunger to be cammed out slightly or what is known as "winking." If the plunger has a straight surface such as that shown in FIG. 3, the same pressure angle is maintained and the plunger returns to its normal engaging position when the load is decreased. Any slight movement of a rounded plunger head changes the pressure angle of the plunger head with respect to the rim of the depression. This is likely to cause the plunger to cam out of the depression during some phase of normal operation since the change in the pressure angle would be in a direction less conducive for maintaining engagement. This winking effect is especially critical in box motions because the loading conditions vary greatly during a box shift. Since bull gear 10 is constantly rotating when one of the gears 12 or 14 is selected for engagement, it is engaged at full speed, thus putting maximum strain on drive coupling 32 and causing plunger 37 to "wink." The loading forces also differ for every box shift; for instance, the degree of shift may vary from one box to four or the boxes may be moved up or down.

A still further requirement of plunger 37 is that it be larger in diameter than depression 42 to insure that conical surface 54 always makes contact with rim 58.

Plunger 37 is anchored in hole 38 by a nut 60 which is threaded on the end 62 of an extending reduced portion 64 of plunger 37. Nut 60 is tightened against a plug 66 which has a reduced portion 68 fitted into a reduced portion 70 of hole 38 and through which portion 64 of plunger extends. By turning nut 60 plunger 37 can be drawn in or out to make minor adjustments in spring pressure to maintain the standardized requirement.

Referring to FIG. 4 there is shown a modified plunger 65 which is the same as plunger 37 in every respect except for the shape of extending portion 48 which has rounded edges 72 instead of being tapered but is for the same purpose as the taper.

Having thus described the invention it will be obvious to those skilled in the art that changes and modifications of the foregoing specific examples may be made without departing from the spirit or the scope of the invention in the appended claims.

What is claimed is:

1. In a yieldable drive coupling comprising: a driving member, a driven member adjacent said driving member, and a spring loaded plunger slidable in a retaining hole extending therein from the adjacent surface of one of said members, said plunger having a head with a substantially conical portion having a sloping surface which extends into a round depression in the adjacent surface of the other of said members; the improvement being that the base of said conical portion has a slightly larger diameter than the outer rim of said round depression and the sloping surface of said plunger head is at a greater angle with respect to a longitudinal axis of said plunger and said round depression than is the circumferential surface defining said round depression, whereby said plunger will contact said outer rim, enabling said driving member to drive said driven member under normal load conditions, and to be cammed into its retaining hole by said outer rim to disconnect said driving member from said driven member when the coupling is subjected to abnormally high load conditions, and the amount of high load necessary to cam said plunger out of engagement with said round depression is consistent due to the consistent contacting position of said plunger in said round depression.

2. In a yieldable drive coupling as described in claim 1 wherein the plunger head has a second portion which is slidable within said retaining hole, and has a slight inward taper in a direction away from said conical portion.

3. In a yieldable drive coupling as described in claim 1 wherein the plunger head portion has a second portion which is slidable within said retaining hole and has a rounded edge on the end which is opposite said conical portion.

4. In a yieldable drive coupling as described in claim 1 wherein the difference in angles between the sloping surface of said conical portion and the side wall of said round depression is greater than 2° with respect to a longitudinal axis of said plunger and depression.

5. In a loom, a yieldable drive coupling for a shuttle box shifting mechanism comprising: a driving shaft, a driving collar keyed to said shaft, a box motion driving member mounted on said driving shaft for free rotation thereon adjacent said drive collar, and a spring loaded plunger slidable in a retaining hole extending therein from the surface of said drive collar which abuts said box motion driving member, said plunger having a head with a substantially conical portion having a sloping surface which extends into a round depression in the collar abutting surface of said box motion driving member; the improvement being that the base of said conical portion has a slightly larger diameter than the outer rim of said round depression and the sloping surface of said plunger head is at a greater angle to a longitudinal axis of said plunger and said round depression than is the circumferential surface defining said round depression, whereby said plunger will contact said outer rim edge of said round depression enabling said drive collar to drive said box motion driving member under normal load conditions, to be cammed into its cylindrical hole by said outer rim to disconnect said drive collar from said box motion driving member when the coupling is subjected to abnormally high load conditions, and the amount of high load necessary to cam said plunger out of engagement with said round depression is consistent due to the consistent contacting position of said plunger in said round depression.

6. In a yieldable drive coupling as described in claim 5 wherein the plunger head has a second portion which is slidable within said retaining hole and is substantially cylindrical with a slight inward taper in a direction away from said conical portion.

7. In a yieldable drive coupling as described in claim 5 wherein the plunger head has a second portion which is slidable within said retaining hole and has a rounded edge on the end which is opposite said conical portion.

8. In a yieldable drive coupling as described in claim 5 wherein the difference in angles between the sloping surface of said conical portion and the side wall of said round depression is greater than 2° with respect to a longitudinal axis of said plunger and depression.

References Cited
UNITED STATES PATENTS

| | | | |
|---|---|---|---|
| 998,615 | 7/1911 | Huneke | 64—29 X |
| 2,148,481 | 2/1939 | Frank | 192—56 |
| 2,866,325 | 12/1958 | Wagner et al. | 64—29 |
| 2,959,945 | 11/1960 | Hugo et al. | 64—29 |
| 3,252,303 | 5/1966 | Weasler et al. | 64—29 |
| 3,282,387 | 11/1966 | Becker et al. | 64—29 X |

HALL C. COE, *Primary Examiner.*